United States Patent [19]

Kawasaki et al.

[11] 4,285,161
[45] Aug. 25, 1981

[54] MULCHER

[75] Inventors: Masami Kawasaki; Toschimi Ohtori, both of Sakai; Kunisuke Sukigara; Mitsuo Satoh, both of Okazaki, all of Japan

[73] Assignee: Kubota Ltd., Osaka, Japan

[21] Appl. No.: 132,122

[22] Filed: Mar. 20, 1980

[30] Foreign Application Priority Data

Apr. 3, 1979 [JP] Japan .................................. 54-40742

[51] Int. Cl.³ .............................................. A01G 7/00
[52] U.S. Cl. ............................................ 47/9; 111/3; 172/701
[58] Field of Search .......... 47/9; 111/3, 2, 1, DIG. 1; 172/701

[56] References Cited

U.S. PATENT DOCUMENTS

| | | | |
|---|---|---|---|
| 1,562,353 | 11/1925 | McGuire et al. | 47/9 |
| 2,078,872 | 4/1937 | Pfeiffer | 47/9 |
| 3,020,859 | 2/1962 | Kang | 47/9 X |
| 3,107,637 | 10/1963 | Saifuku | 111/3 |
| 3,121,973 | 2/1964 | Phillips et al. | 47/9 |
| 3,139,847 | 7/1964 | Bucher et al. | 47/9 X |
| 3,176,635 | 4/1965 | Mabon | 47/9 X |
| 3,184,889 | 5/1965 | Gray et al. | 47/9 |
| 3,204,589 | 9/1965 | Blackhurst et al. | 47/9 X |
| 3,234,691 | 2/1966 | Cowell | 47/9 |
| 3,293,797 | 12/1966 | Kappelmann et al. | 47/9 |
| 3,353,297 | 11/1967 | Gervais | 47/9 X |
| 3,460,493 | 8/1969 | Stephenson et al. | 47/9 X |
| 3,468,267 | 9/1969 | Morris et al. | 47/9 X |
| 3,559,599 | 2/1971 | Hoadley | 47/9 X |
| 3,751,821 | 8/1973 | Olmo et al. | 47/9 X |
| 3,791,321 | 2/1974 | Tsutsumi | 47/9 X |
| 4,092,936 | 6/1978 | Griffin et al. | 47/9 X |

FOREIGN PATENT DOCUMENTS 1356657 2/1964 France .

Primary Examiner—Robert E. Bagwill
Attorney, Agent, or Firm—Armstrong, Nikaido, Marmelstein & Kubovcik

[57] ABSTRACT

A mulcher having a roll of film, a ridger for making a planting ridge to be covered by the film, means for keeping the film taut over the ridge while soil is placed on the film edges, and the film roll is rollably supported to insure dispensing of the film from a fixed position throughout the mulching.

16 Claims, 15 Drawing Figures

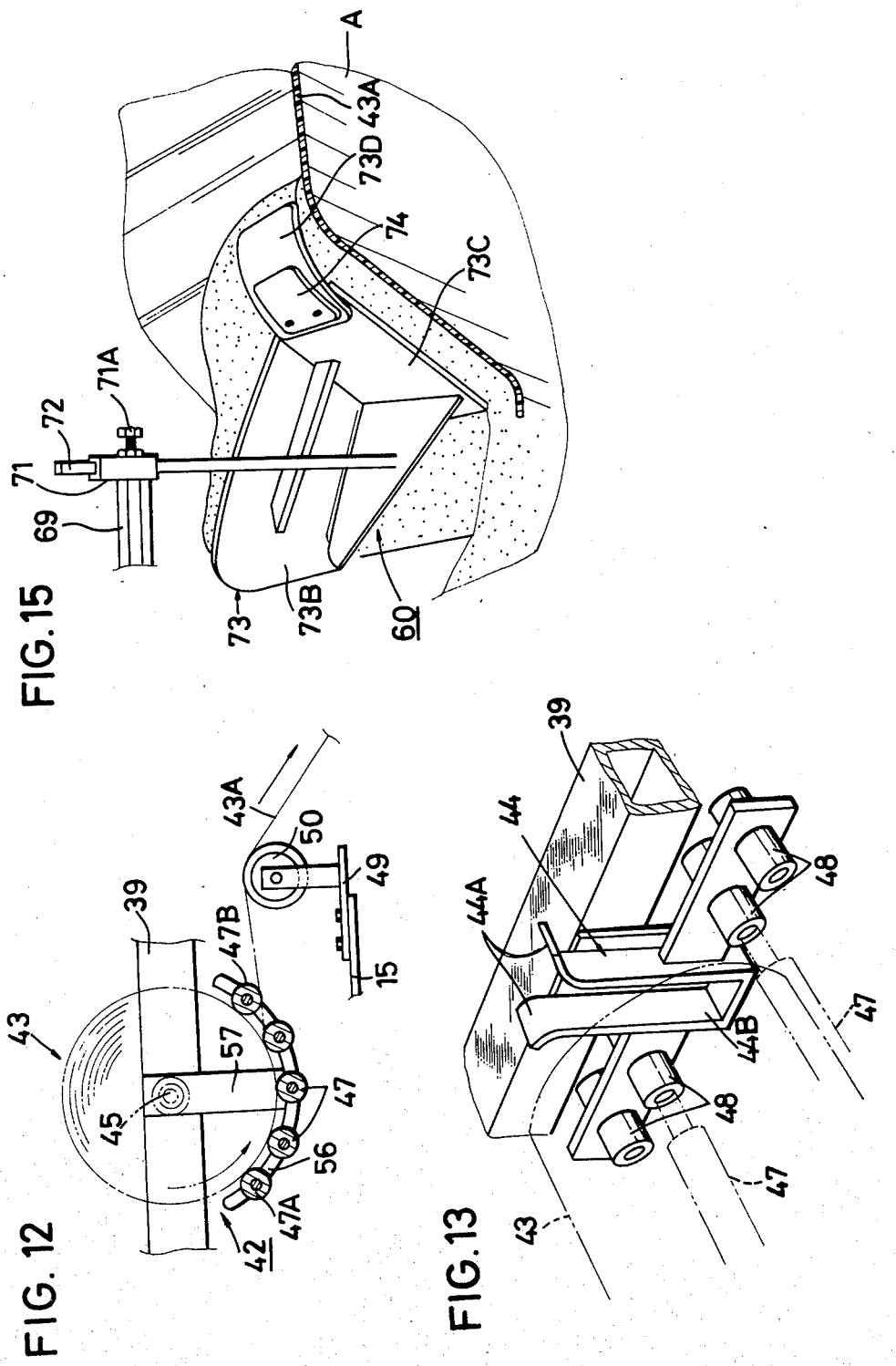

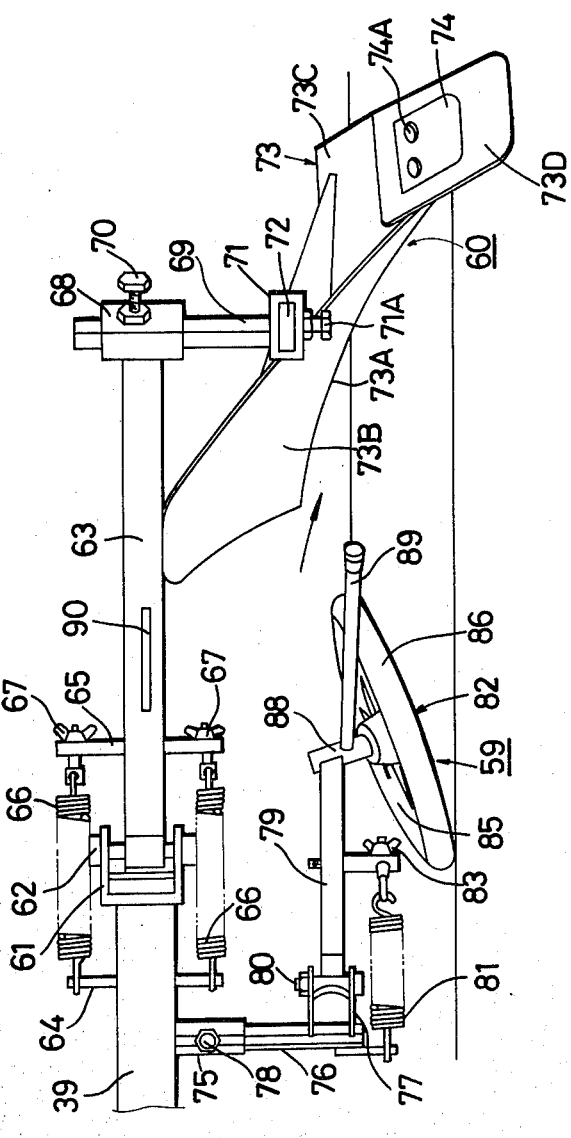

MULCHER

BACKGROUND OF THE INVENTION

The present invention relates to a mulcher, and more particularly to an apparatus for continuously paying off a strip of film and laying down the strip over a ridge longitudinally thereof while covering the laid-down strip with soil on its opposite side portions longitudinally thereof.

Mulching has been widely accepted practice for growing plants, such as tobacco, lettaces, etc.

To assure sound growth of crops and protect them from frost, wind and rain, a strip of plastics film, sheet or the like is laid down over a ridge on the ground longitudinally thereof, and the laid-down mulch is covered with soil on its opposite side portions longitudinally thereof to prevent removal of the mulch.

As machines for applying mulches mechanically and efficiently, there are mulchers of the self-propelling type and those adapted to be attached to and pulled by a tractor with use of a three-point link or the like. The mulchers of either type consist essentially of a ridge shaping assembly, a roll suspending or supporting assembly for supporting a roll of film strip at right angles with the ridge, namely, with the direction of travel of the mulcher rotatably about its axis, a pair of opposite wheels for pressing opposite side portions of the strip against the ground to pay off the strip, and a pair of soil applicators for covering the paid-off strip with soil on its opposite side portions longitudinally thereof.

With conventional roll supporting or suspending assemblies, both ends of the roll, namely, both ends of a spool or support spindle are fixedly supported by bearing portions attached to the frame of the mulcher, so that with the progress of mulching operation, the diameter of the roll invariably decreases, incessantly altering the peripheral speed of the roll and also the position where the strip is paid off the roll to vary the length of travel of the strip from this position to the position where it is pressed against the ground by the pair of pressing wheels. Since the strip can be laid down on the ridge accurately and smoothly only when under tension, variations in the length of travel of the strip are objectionable. Especially when the operation is performed in a strong wind, variations in the distance of travel will partly loosen the strip and consequently produce wrinkles or folds in the strip laid down on the ridge. Such objections must be avoided. In continental areas as in the U.S. and Canada, ridges have very large lengths and require the use of rolls of large diameter. The operation therefore involves marked variations in the above-mentioned peripheral speed and position of paying off. It is accordingly critical to eliminate such variations.

Another important problem encountered in the mulching operation is to prevent the rise of the pair of pressing wheels to thereby hold the strip under uniform tension over the ridge and facilitate the subsequent application of soil.

The pressing wheels of the prior art are rotatably supported as positioned in parallel to each other. The wheels are therefore unable to hold the strip properly tensioned uniformly over the entire width of the ridge. If the wheels have a tread of soft sponge or the like, it would be difficult to force the strip into the ground.

Another important problem experienced with the mulching operation is to prevent the removal of the laid-down strip due to wind or rain and also the removal of the strip-holding soil covering from the strip. Soil applicators heretofore used are of the disc rotor type or shoe type. These applicators are adapted to apply soil to the laid-down strip only at the bottom of the ridge to hold the strip. If the mulch is used on a sandy ground where it rains heavily as in some of the continental areas of the U.S. and Canada, the soil covering with easily flow away. Further if water lodges in the furrows of a dry field, the ridges as well as the soil covering will collapse and flow away.

Another important problem involved in the mulching operation is to prevent the collapse of the ridge by fully compacting the soil, whereas conventional ridge shaping devices are uable to ensure sufficient compaction of the soil if it is sandy, or permit collapse of ridges of clayey soil in areas where it rains heavily. Such objection is more likely to occur when high ridges are to be mulched.

SUMMARY OF THE INVENTION

An object of the present invention is to provide a mulcher in which the roll of film strip to be positioned transversely of the direction of advance of the mulcher can be supported horizontally on the frame of the mulcher rotatably about its own axis so that the film strip can be paid off from a fixed position along a path of constant length with the roll restrained from moving forward or backward, the mulcher thus being adapted to lay down the strip on ridges under proper tension.

Another object of the invention is to provide a mulcher in which the means for supporting a roll of film strip comprises rolls for supporting the film roll and portions for restraining the film roll forward or backward deflection to render the film roll rotatable about its own axis with reduced resistance so that the strip can be paid off smoothly without deviation.

Another object of the invention is to provide a mulcher comprising support members attached to the frame of the mulcher and provided with bearing portions for support rolls and with restraining portions so that the roll of strip can be placed in position and is replaceable with ease, the support rolls being detachably mounted on the bearing portions to render the mulcher usable with film strip rolls of somewhat varying shapes and dimensions and enable the mulcher to pay off the strip from a definite position at all times.

Another object of the invention is to provide a mulcher in which the rolled film strip can be paid off always from a definite position and then pressed against the ground by a pair of pressing wheels while being slightly tensioned transversely thereof, namely, widthwise of the ridge and rearward so as to be laid down over the ridge under uniform tension.

Another object of the invention is to provide a mulcher in which the film strip can be tensioned as slightly stretched widthwise of the ridge and forced into the ground at least by a pair of pressing wheels so that the strip can be subsequently covered with soil satisfactorily.

Another object of the invention is to provide a mulcher including a pair of opposed soil applicators for covering the laid-down strip with soil, each of the applicator comprising an upstanding portion for dividing soil inwardly toward the other and an upstanding pressing portion extending rearward from the soil dividing portion to face the shoulder of the ridge so that the soil can be applied to the laid-down strip over an increased area including the shoulder as well as the bottom of the ridge to completely prevent the separation of the strip from the ridge.

Still another object of the invention is to provide a mulcher having incorporated therein a ridge shaping assembly for shaping cultivated soil into a ridge, the ridge shaping assembly comprising a pair of soil guides positioned at its front portion for guiding the soil inward toward each other and compacting shaping portions for compacting the ridge to assure the subsequent strip laying operation with improved accuracy and uniformity, each of the compacting portions having a soil cutting portion including a soil dividing portion extending outwardly sidewise so as to prepare a sufficient quantity of soil for the subsequent soil applying operation and thereby effectively present separation of the strip from the ridge.

BRIEF DESCRIPTION OF THE DRAWINGS

FIGS. 8 to 12 are side elevations in section showing some examples of film roll supporting means to illustrate how the film strip is paid out;

FIG. 13 is a perspective view showing another film roll supporting means, especially a modified supporting member;

FIG. 14 is a plan view showing the pressing wheel and the soil applicator on the right side in greater detail; and FIG. 15 is a perspective view showing the soil applicator during operation.

DETAILED DESCRIPTION OF THE INVENTION

With reference to the drawings, the preferred emobiments of the invention will be described in detail.

Figure 1:
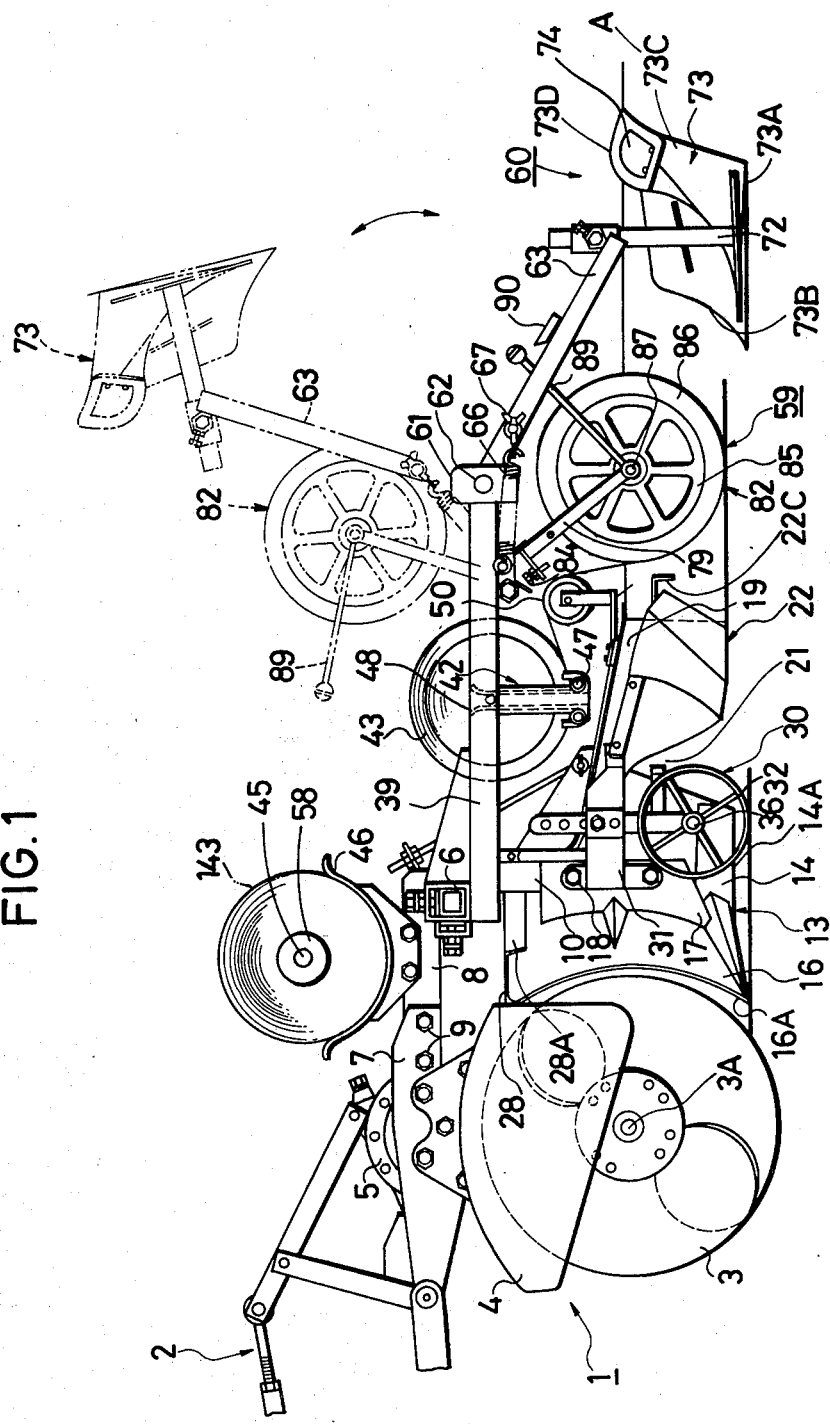
FIG. 1 is an overall side elevation showing a mulcher of the type to be attached to a tractor, with strip pressing wheels and soil applicator also shown in their lifted position.
Figure 2:
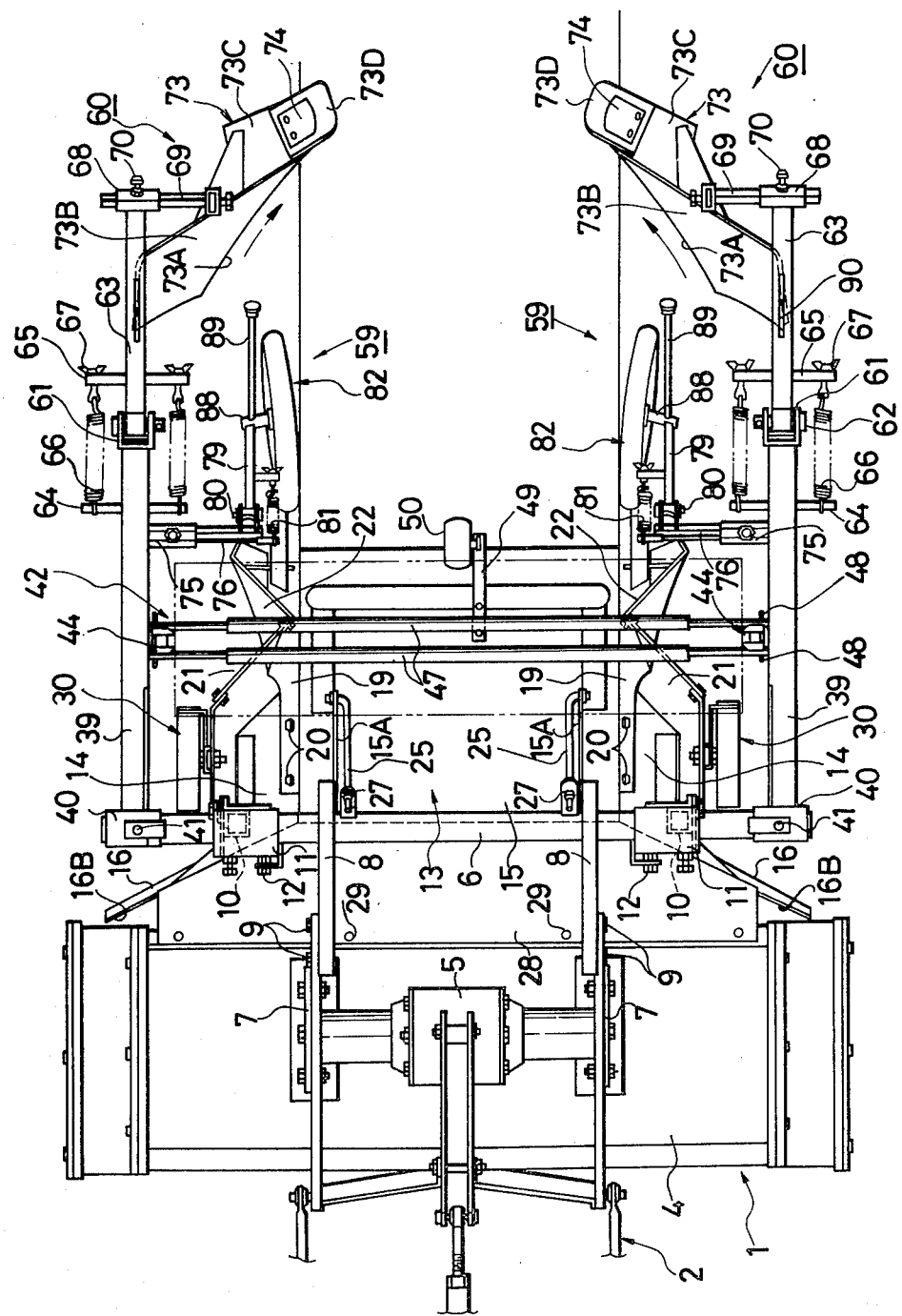
FIG. 2 is an overall plan view showing the mulcher.

Referring to FIGS. 1 and 2 showing a mulcher in its entirety, a tiller unit 1 is attached by a three-point link 2 to an unillustrated tractor. The tiller unit 1 consists chiefly of a tilling member 3 rotatable about a horizontal transverse axis, a cover member 4 for covering the tilling member 3, and a transmission case 5 housing a power transmitting member, such as a chain, for receiving power from the unillustrated PTO shaft of the tractor to drive the tilling member 3. Although a transmission assembly of the center drive type is used for the tilling member 3 in the illustrated embodiment, the assembly may alternatively be of the side drive type.

While the tilling member 3 shown in FIG. 1 is a disc rotor detachably but fixedly mounted on a horizontal transverse shaft 3A, the member 3 may comprise a screw rotor, a tine or a combination thereof. Preferably the tilling member is one which, when driven, forces the cultivated soil toward the center.

A tool bar 6, serving substantially as a component of the frame of the mulcher, is in the form of a tube of square cross section in the illustrated embodiment and extends transversely of the direction of cultivation. A pair of connecting bars 8 is attached to a tiller frame 7 by fastening members 9 and extends rearward, with the tool bar 6 supported by the rear ends of the bars 8. The bar 6 is positioned substantially above and to the rear of the tilling member 3. The tool bar 6 is slidably or fixedly provided with a pair of opposed supports 10 for a ridge shaping assembly 13. In the illustrated embodiment, the supports 10 are attached to box-shaped mounts 11 slidably fitted to the tool bar 6 and positioned on the outer sides of the connecting bars 8. The mounts 11 are fastened to the bar 6 with set bolts 12. (See FIG. 2.)

When the set bolts 12 are loosened, the mounts 11 are slidable on the bar 6 axially thereof, whereby the ridge shaping assembly 13 can be set for the desired width of cultivation.

The ridge shaping assembly 13 is attached to the pair of supports 10 and is positioned substantially to the rear of the tilling member 3. The ridge shaping assembly 13 chiefly comprises a pair of opposed side shaping plates 14 and a top shaping plate 15 extending therebetween and covering the intervening space. A soil guide 16 is disposed to the front of each plate 14.

The side shaping plate 14 is attached to the support 10 by a blacket 17 and bolts 18. As is best seen in FIG. 2, the soil guide 16 has an upstanding soil guide face 16B which extends from its outer edge inwardly rearward with respect to the direction of advance of the mulcher to guide the cultivated soil inward. As shown in FIG. 1, the front edge of the soil guide 16 extends arcuately along the path of rotation of the tilling member 3 as at 16A, permitting the assembly 13 to position close to the member 3. It is seen in FIG. 2 that the front outer ends of the guide faces 16B are at a distance substantially equal to the width of cultivation and that the faces 16B extend toward each other backward.

With reference to FIG. 2, the pair of side shaping plates 14 extend along the direction of advance of the mulcher and are opposed to each other. Preferably the spacing between the plates 14 decreases toward the rear so as to compact the soil effectively. The plates 14 may extend in parallel to each other at uniform spacing.

As seen in FIG. 1, the side shaping plate 14 has a horizontal bottom 14A. The soil guide 16 has a bottom extending forwardly downward to a level lower than the bottom 14A. The side shaping plates 14 have inner upstanding shaping faces 14B in conformity with the shape to which the soil is to be collected, especially to shape the shoulder portions of the ridge.

Figure 4:
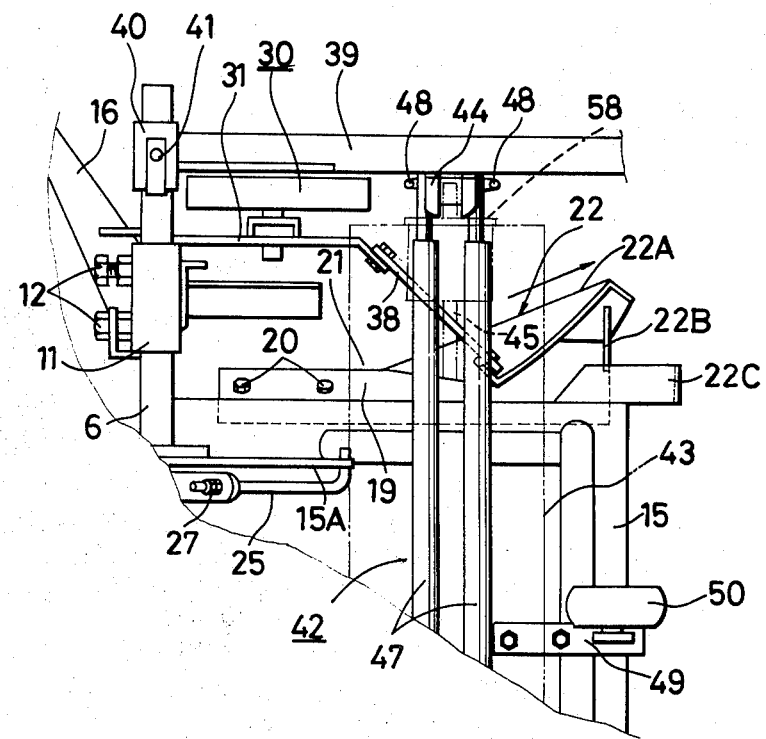
FIG. 4 is a plan view showing a ridge forming assembly on the right side and a film roll supporting assembly.
Figure 5:
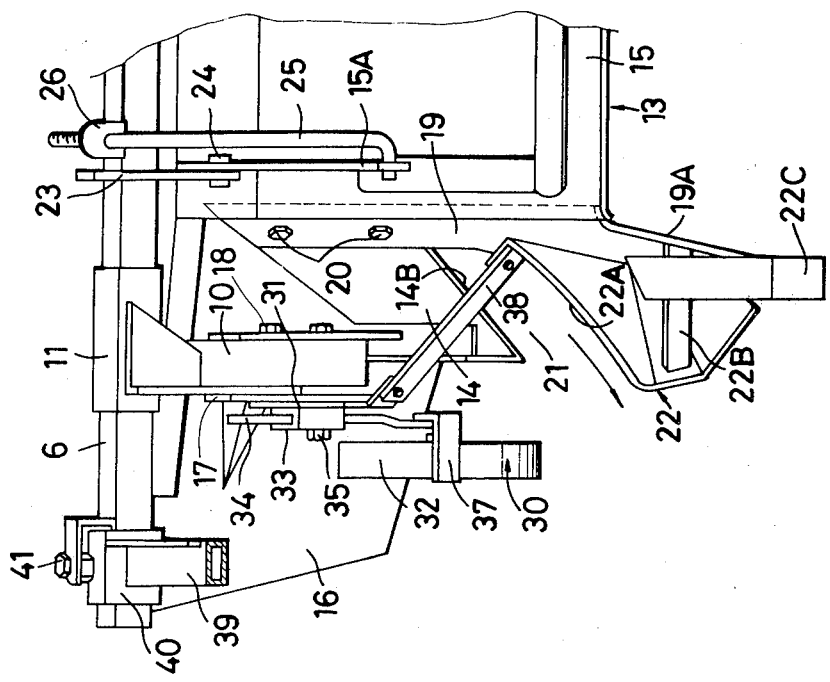
FIG. 5 is a plan view showing a ridge shaping assembly on the left side as it is seen in an oblique direction, with the film roll supporting assembly omitted.

A compacting shaping plate 19 is detachably fastened by bolts 20 to the top portion of the plate 14 as shown in FIG. 2 and FIGS. 4 and 5. The plate 19 extends rearward beyond the plate 14 and has a rear portion 19A which, as best seen in FIG. 5, is positioned inwardly of the upstanding shaping face 14B of the plate 14 and extends downward more steeply than the inclination of the face 14B. Thus as best seen in FIGS. 4 and 5, a substantially triangular opening 21 corresponding to the shoulder of the ridge is formed between the rear portion of the plate 14 and the compacting plate 19.

Further as shown in FIG. 1, the compacting plate 19 has a progressively decreasing height, such that the plate 19 coacts with the portion 14B of the side shaping plate 14 to compact the ridge shouler with the elongated surfaces.

A soil cutting member 22 is attached to an outer rear portion of the compacting plate 19 and positioned to the rear of the opening 21. As best shown in FIGS. 4 and 5, the soil cutting member 22 guides the soil from the opening 21 in the direction of an arrow shown and has a soil dividing portion 22A by which the soil cut by the front lower edge of the member 22 is similarly guided. The soil dividing portion 22A is reinforced by a lateral bracket 22B and thereby attached to the compacting portion 19A. A strip holding bracket 22C extending rearward is attached to the bracket 22B (see FIGS. 4 and 5).

Figure 3:
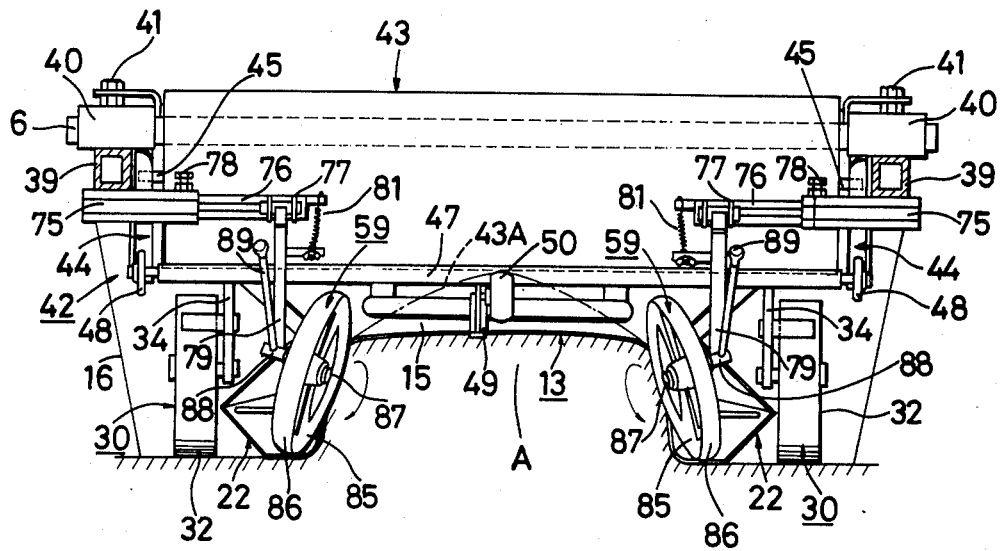
FIG. 3 is a rear view partly in section and showing the same with the soil applicators omitted.

As seen in FIGS. 2 to 5, the top shaping plate 15 is provided between the pairs of opposed side shaping plates 14 and compacting shaping plates 19 to constitute a ridge shaping portion substantially large in its front and small in its rear, and trapezoidal in section as illustrated in FIG. 3. The plate 15 for substantially shaping the top of the ridge has a pair of support brackets 15A each of which is pivoted by a pin 24 to a bracket 23 extending downward from the connecting bar 8 or tool bar 6. Thus the plate 15 is pivotally movable on the pins 24 (see FIGS. 1, 2 and 5). The plate 15 is further suspended from the bar 6 or 8 by a pair of suspender rods 25. As shown in FIGS. 2 and 5, the suspender rod 25 has a hooked lower end pivoted to the support bracket 15A on the plate 15 and extends through a stay 26 attached to the tool bar 6. The rod 25 has screwed thereon a plurality of nuts 27. When the nuts 27 are loosened or tightened up, the plate 15 is turnable about the pins 24 or can be held in a fixed position to adjust the degree of compaction of the soil at the top of the ridge by the plate 15.

Indicated at 28 in FIGS. 1 and 2 is a cover having one end fastened to the tiller cover 4 by bolts 29 and an attaching end portion 28A on the top of the soil guides 16 as attached to a side portions of the guides. The cover 28 prevents soil from scattering outward from the tiller unit 1.

FIGS. 1 to 5 further show a pair of gauge means 30 comprising a wheel-shaped gauge member 32 supported by a bracket 31 attached to the bracket 17 for the soil guide and extending rearward. The member 32 is fixed to the bracket 31 at an adjustable level. As shown in FIG. 5, the bracket 31 is provided with a vertical tube 33 having a gauge support bar 34 extending therethrough. A fastening member 35 on the tube 33 is fitted in one of holes formed in the bar 34, whereby the bar 34 is vertically slidably fixed to the tube 33. The gauge member 32 is rotatably supported by a shaft 36 (see FIG. 1) on a lower portion of the bar 34. Preferably the support bar 34 is provided with a scraper 37 for removing soil from the gauge member 32. The gauge member 30 may be in the form of a sleigh instead of being in the shape of a wheel. The bracket 31 for the gauge means 30 is preferably provided with a stay 38 for reinforcing the soil dividing portion 22A as shown in FIGS. 4 and 5. The stay 38 is so positioned that it will not close the opening 21.

Although a preferred construction of ridge shaping assembly 13 has been described above for shaping a ridge from the soil broken up by the tilling member 3, the tilling and ridge shaping means need not always be provided for the mulcher, since the mulch can be applied to a ridge formed by a separate implement. However, it is desirable that the mulcher be equipped with such tilling and ridge forming means because this assures a continuous operation.

Now means for supporting a roll of the film strip to be applied to the ridge will be described below. With reference to FIGS. 1 to 4, a pair of support bars 39 substantially form the frame of the mulcher. As seen in FIGS. 1, 2 and 4, each of the support bars 39 is provided at its front end with a box-shaped connector 40 which is slidably fitted and fastened to the tool bar 6 by a bolt 41. Accordingly, when the bolts 41 are loosened, the support bars 39 are slidable longitudinally of the tool bar 6 to a properly adjusted position in accordance with the width of the desired ridge. The bars 39 extend from the bar 6 rearward in parallel to each other.

The roll supporting means 42 is disposed at a longitudinally intermediate portion of the support bars 39 inside thereof, above and toward the rear end of the ridge shaping assembly. The supporting means 42 is positionable above the ridge with its opposite ends located on the both sides of the ridge as seen in FIG. 2.

With reference to FIGS. 4 to 13, there are shown several embodiments of the supporting means 42 as well as how a film strip 43A is paid off or withdrawn from its roll 43.

Figure 8:
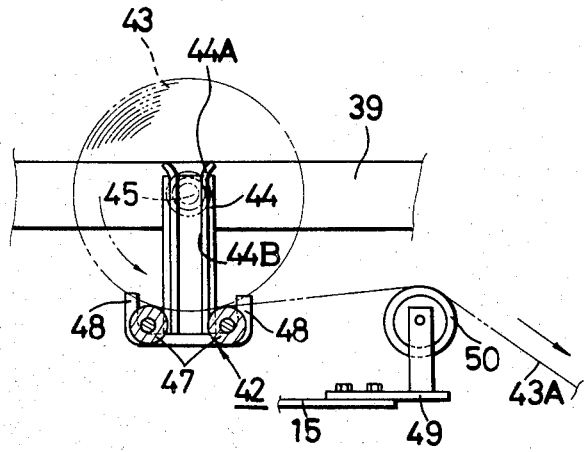

FIGS. 4 and 8 show a first embodiment in which support members 44 are attached to the inner sides of the support bars 39. Each of the support members 44 is in the form of a bottomed case having an enlarged inlet 44A at its upper portion and a vertical groove 44B defined by front and rear walls which serve as portions for restraining the roll 43 from moving forward or backward. The strip 43A is a transparent, or colored or otherwise opaque plastics sheet or film wound on a core 45 into the roll 43. Preferably the core 45 is provided at each end with a tubular core member 58 (see FIG. 6) detachably fitted thereto and fitted in the groove 44B through the enlarged inlet 44A to support the roll 43 in a horizontal position. Both ends of the core 45 may of course be fitted directly in the grooves 44B. In practice, a stock roll 143 is placed on a receptacle 46 on the tiller frame as seen in FIG. 1.

The support member 44 is provided at its lower portion with front and rear bearing portions 48 for support rolls 47 serving as a support assembly. According to the first embodiment, the bearing portion 48 is in the form of a hook. The pair of front and rear support rolls 47 are supported at their opposite ends on the bearing portions 48 of the opposed support members 44 in parallel to each other and also horizontally rotatably to support the strip roll 43 thereon. According to the first embodiment, therefore, the roll 43 which is freely movable along the vertical grooves 44B bears directly on the support rolls 47 under gravity, while being restrained from moving forward or backward by the front and rear walls defining the vertical grooves 44B.

Further according to the first embodiment, a strip tensioning member 50 in the form of a resin roller is rotatably supported by a member 49 positioned substantially at the midportion of the ridge and mounted on the ridge shaping assembly 13, namely, on its plate 15. When the strip 43A paid off from the lower peripheral portion of the roll 43 is passed over the tensioning member 50 and pulled outward in the direction of an arrow in FIG. 8, the roll 43 rolls on the horizontally supported rolls 47, with the strip held under tension at its midportion. The walls defining the grooves 44B restrain the roll 43 from forward or backward movement due to pulling-out friction, vibration or the like. Although the diameter of the roll 43 decreases gradually with the paying-off of the strip, the changes in the paying-off position that would result are remedied by the arrangement in which the roll 43 bears directly on the support rolls 47. Consequently the strip can be paid off or pulled out from a definite position at all times.

Figure 6:
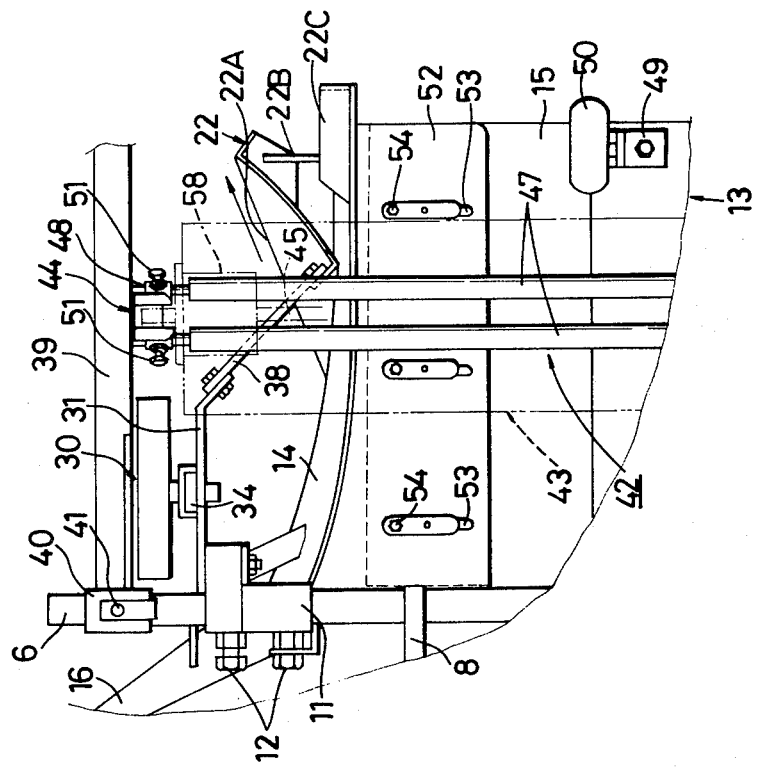
FIG. 6 is a plan view showing a ridge shaping assembly on the right side of another embodiment.
Figure 7:
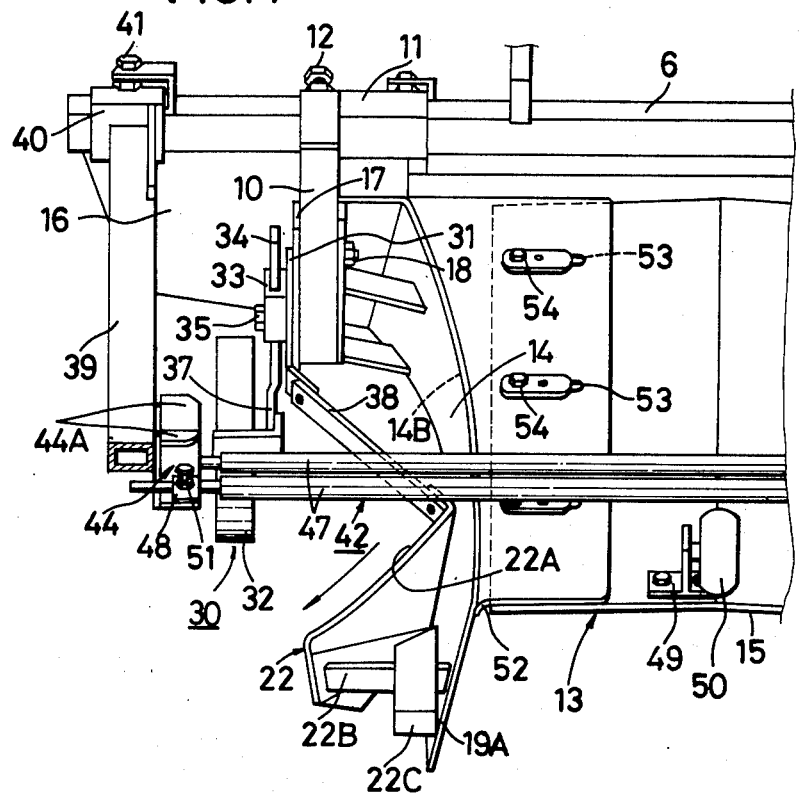
FIG. 7 is a plan view showing a left-side assembly of the embodiment of FIG. 6 as it is seen in an oblique direction.
Figure 9:
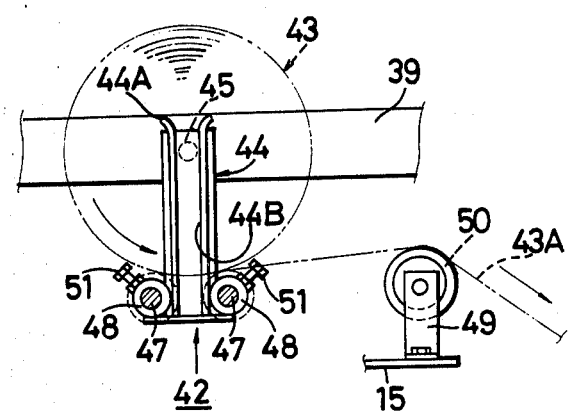

FIGS. 6, 7 and 9 show a second embodiment of the roll supporting means in which the bearing portion 48 comprises a pipe for supporting the end of the support roll 47 serving as a component of the support assembly. The roll 47 fitted in the bearing portion 48 is held by a bolt 51 against axial movement. With the exception of the above construction, the second embodiment has the same construction as the first, so that like parts are referred to by like reference numerals.

With the second embodiment, the strip roll 43 bears directly on and is supported by rolls 47 for the paying-off of the strip in the same manner as in the first embodiment. When the mulcher is driven with no roll 43 placed on the support rolls 47, for example, after the completion of the operation, the support rolls 47 are held to the bearing portions 48 and will not slip off even if jumping due to vibration or the like. In this respect, this embodiment is more preferable than the first.

The embodiment shown in FIGS. 6 and 7 differs from the first embodiment in the construction of the ridge shaping assembly 13. The difference will be described below with use of like reference numerals for like parts.

The side shaping plate 14 of the second embodiment shown in FIGS. 6 and 7 has at its rear portion a compacting portion 19A integral therewith and has a ridge shoulder shaping portion 14B. The opposed shoulder shaping portions 14B are curved toward each other at an intermeidate portion and further extend rearward in parallel to each other. Thus the shoulder shaping portions 14B extend over a substantial distance to define a rearwardly tapering space therebetween to eliminate the opening included in the first embodiment.

Further a striplike plate 52 for attaching the top shaping plate 15 is attached to the plate 14 as by welding. The top shaping plate 15 is fastened to the bottom surfaces of the attaching plates 15. By means of fastening members 54 on the plate 15 and slots 53 formed in the attaching plates 52 widthwise of the ridge, the plate 15 is adjustably fastened to the plates 52 in accordance with the width of the ridge. Thus the suspender rods 25 used for the first embodiment shown in FIGS. 4 and 5 are omitted from the embodiment shown in FIGS. 6 and 7. Like the first embodiment, the second embodiment is equipped with gauge means 30, etc.

Figure 10:
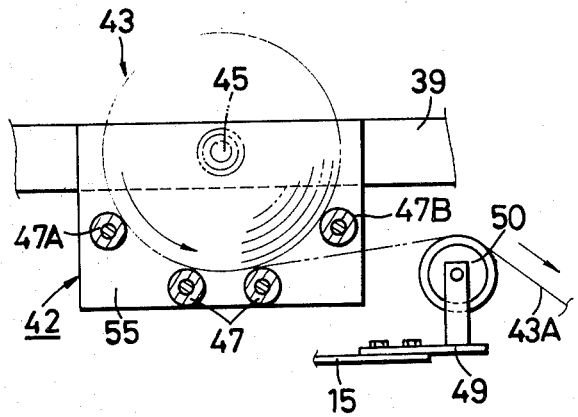

FIG. 10 shows a third embodiment of the strip roll supporting means 42. A pair of platelike bearing portions 55 are attached to the support bars 39. A plurality of support rolls 47, for example, four rolls 47 positionable across the ridge at right angles thereto are detachably supported by the bearing portions 55 rotatably in a horizontal position. The roll 43 on the core 45 is placed on the support rolls 47.

FIG. 10 shows a third embodiment in which a pair of front and rear support rolls 47A and 47B serve substantially as portions for restraining the strip roll 43 from forward or backward movement. The roll 43 is supported in the same manner as in the first and second embodiments, permitting the strip 43A to be paid out or pulled out from a definite position.

Figure 11:
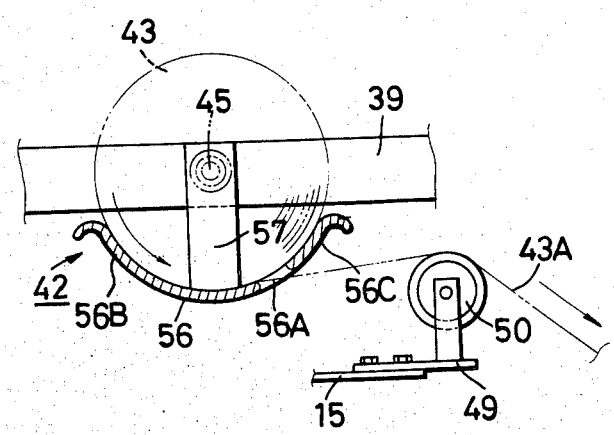

FIG. 11 shows a fourth embodiment in which brackets 57 corresponding to the support members 44 are attached to the support bars 39 and fixedly provided with an arculate support 56 formed with a strip aperture 56A. With the roll 43 placed on the support 56, the strip 43A is paid off through the aperture 56A. With the embodiment shown in FIG. 11, the front and rear portions 56B and 56C of the arcuate support 56 serve as portions for restraining the strip roll 53 from moving forward or backward. With a reduction in the diameter of the roll 53, the fourth embodiment will permit the roll 53 to slightly move forward or backward, but this movement is substantially permissible.

FIG. 12 shows a fifth embodiment in which a pair of opposed brackets 57 are each provided at the lower end thereof with an arcuate support 56. Support rolls 47 arranged along a circumference are rollably and detachably supported by and extend between the arcuate supports 56. With the embodiment of FIG. 12, the outer rolls 47A and 47B serve substantially as portions for restraining the roll 43 from moving forward or backward.

FIG. 13 shows a sixth embodiment of the supporting means 42. A supporting member 44 provided with an enlarged inlet 44A and a vertical groove 44B has four tubular bearing portions 48 arranged horizontally in parallel. Two support rolls 47 are selectively supported by these bearing portions, whereby strip rolls of varying sizes can be supported stably.

In any of the foregoing embodiments, the support roll 47 is preferably of double construction including a freely rotatable outer member. Further as already mentioned with referenece to FIG. 6, the core 45 is preferably provided at its opposite ends with tubular core members 58 of large diameter, with the film strip wound around the members 58. After the strip has been paid off, the tubular core members 58 are retained on the support rolls 47.

For the prevention of deflection of the roll 43, the roll 43 should preferably be supported over the entire length thereof, by the supporting means 42 disposed at right angles to the direction of advance of the mulcher. The roll 43 may be supported partially at its opposite ends or at its axially intermediate portions. Although not shown, the support roll 47 may be positioned immediately below the vertical groove 44B. While the strip roll 43 is horizontally rotatably supported by the support rolls 47, supports 56 or like support means on the bars 39, the core or tubular core members 58 may bear directly on and be horizontally rotatably supported by the bars 39, as restrained from forward or backward movement. Accordingly the support means supports the strip roll 43 with its outer periphery bearing thereon, or supports the core 45 or core members 58. In the former case, it is preferably to bias the core 45 toward the support means by springs to hold the roll 43 against vibration or jumping.

With reference to FIGS. 1 to 3 and FIGS. 14 and 15, strip pressing means 59 and a soil applicator 60 will now be described.

The pair of opposed support bars 39 extending rearward from the tool bar 6 have attached to their rear ends bifurcated brackets 61 to which movable support bars 63 are pivoted by lateral pins 62. The bars 63, which are turnable upward or downward, extend rearward in parallel to each other. The fixed and movable brackets 39 and 63 are provided with spring supports 64 and 65 respectively. A pair of coiled springs 66 disposed on opposite sides of each bracket 61 are connected between the supports 64 and 65.

The springs 66 bias the movable bars 63 toward the ground and have screw engaging members 67 as seen in FIG. 14, whereby the force of the springs is made adjustable.

Attached to the rear end of each movable bar 63 is a lateral connecting tube 68, through which a lateral rod 69 slidably extends. The rod 69 can be fixed to the tube 68 by a bolt 70. In the preferred embodiment, both the tube 68 and lateral rod 69 are square in cross section. The lateral rod 69 has attached to its inner end a vertical connecting tube 71. A support bar 72 extending through the tube 71 is equipped with soil applying means 60.

The position of the means 60 is vertically adjustable by sliding the support bar 72 longitudinally thereof and tightening up a bolt 71A. The soil applying means 60 in the preferred embodiment is in the form of a shoe. Although a disc rotor is usable as the means 60, the shoe-type means shown has the outstanding advantage that the laid-down strip can be covered with soil over a wide area including the bottom and shoulder of the ridge.

The means 60 comprises a soil applicator 73 consisting essentially of a bottom plate 73A and a soil dividing portion 73B. As best seen in FIG. 14, the soil dividing portion 73B extends inwardly rearward with respect to the direction of advance of the mulcher and includes an upstanding part for guiding the soil inward as indicated by an arrow. The upstanding part extends rearward with a progressively increasing height in corresponding relation to the ridge and is provided with an upstanding pressing portion 73C by which the soil guided inward is compacted over the area of from ridge shoulder to the top. As best seen in FIGS. 14 and 15, a curved flexible pressing member 73D of resin, rubber or the like is detachably attached to the pressing portion 73C with bolts 74A and a rigid plate 74. The support bar 63 equipped with the shoe-type soil applicator 73 biases the bottom plate 73A of the applicator 73 toward the ground under the action of the springs 66. The downward movement of the support bar 63 can be limited by a screw-threaded adjustable stopper provided on the fixed bar 39 below the lateral pin 62.

The movable support bar 63 carrying the soil applying means 60 at its rear end is turnable about the lateral pin 62 against the springs 66, such that when the bar 63 is raised to bring the springs 66 above the lateral pin 62, the means 60 is retainable in its raised position as indicated in a phantom line in FIG. 1. Thus the springs 66, lateral pin 62, etc. act to selectively shift the means 60.

A pair of pressing means 59 are disposed between the soil applicators 73 and the soil dividing portions 22A of the ridge shaping assembly, inside the applicators 73. The means 59 are located to the rear of the roll supporting means 42 therebelow.

As shown in FIGS. 1 to 3 and FIG. 14, the opposed pressing means 59 are attached to the fixed support bars 39. Attached to the inner side of each support bar 39 at a rear portion thereof is a lateral polygonal tube 75 having detachably secured thereto a support rod 76 which is fixed by a bolt 78 and provided with a bifurcated bracket 77. A post 79 pivoted to the bracket 77 by a pin 80 having a fastening member extends rearwardly downward.

A pressing wheel 82 mounted on the lower end of the post 79 is biased toward the ground by a coiled spring 81 connected between the support rod 76 and the post 79. As indicated in a phantom line in FIG. 1, the post 79 is liftable about the pin 80 against the action of the spring 81. Thus the spring 81, etc. act to shift the wheel selectively to one of the two positions. The force of the spring 81 is adjustable by advancing or retracting a threaded engaging member 83 (see FIG. 14). It is preferable to provide a stopper 84 shown in FIG. 1.

The pressing wheel 82 comprises a spoked frame 85 and a tread 86 made of hard rubber or resin and fixedly fitting around the frame 85. The wheel 82 has an axle 87 (see FIG. 3) which is rotatably supported by a hub tube 88 attached to the lower end of the post 79. The hub tube 88 extends inwardly backward with respect to the direction of advance of the mulcher as seen in FIG. 14 and is also inclined downward toward its inner end. The pressing wheels 82, when rolling on the ground as supported by the hub tubes 88, press the strip against the ground while slightly tensioning the strip outward sidewise of the ridge. At the same time, the wheels 82 act to force the strip substantially into the ground.

The hub tube 88 is provided with a handle 89, by which the wheel 82 is upwardly turnable about the pin 80 against the spring 81. When the mulcher is to be started up, the outer periphery of the pressing wheel 82 coacts with the strip holding bracket 22C (FIG. 1) mentioned to hold the strip 43A paid off from the roll 43. The pressing wheel 82 can be in the form of a disc or sleigh. Further the wheel 82 can be mounted on the movable bar 63. Indicated at 90 in FIGS. 1, 2 and 14 are film cutters.

A description will now be given of the operation of the mulcher which consists essentially of the strip roll supporting means, the pressing means and the soil applying means described above.

With the soil applying means 60 and the pressing means 59 held in their raised positions, the strip 43A is pulled out from a lower peripheral portion of its roll 43 placed transversely of the direction of advance of the mulcher and is passed at its center portion over the tensioning member 50. The working implements are then lowered for start up. At this time, the leading end of the strip is nipped by the holding brackets 22C and the pressing wheels 82, and the soil applying means 60 are placed into contact with the ground. When a ridge A has not been formed, the mulcher is operated with the tiller unit and the ridge shaping means provided on the front portion of the working machine. The tilling member 3 is driven, and the tilled soil is guided inward and raised by the soil guides 16 and is fed to the ridge shaping assembly 13.

The shaping assembly 13 comprises the side shaping plate 14 and top shaping plate 15 which extend rearward over a substantial distance and are tapered rearward. The assembly 13 therefore forms a ridge A while progressively compacting the soil. When there is an excess of soil, the assembly 13 undesirably rises, but with the embodiment in which the plate 15 is upwardly or downwardly movable, the plate 15 alone will rise,- while the excessive soil will escape through the openings 21. The ridge A is shaped by being compacted with the plates 14 at its shoulder portions and with the plate 15 at its top. Since the shaping assembly has an elongated length, the ridge can be compacted effectively against collapsing.

The shaping assembly 13 is provided with soil cutting members 22, which cut the soil from the ridge bottom portions to form neat furrows, while the removed soil is guided in the directions of the arrows in FIGS. 4 and 5 by the dividing portions 22A and is subsequently used for covering. When the machine has openings 21, the soil escaping therethrough is similarly guided by the dividing portions 22A. In either case, the bottom portions of the members 22 form neatly finished furrows.

When the ridge A has been formed in advance, a working machine equipped with no ridge shaping assembly or tilting unit will be used. For mulching, the strip 43A is passed over the tensioning member 50 and laid down over the ridge and then pressed against the ground by the pair of pressing wheels 82 rolling on opposite side portions of the strip longitudinally thereof. The strip roll 43 on the supporting means 42 is rotated about its own axis by the rotation of the pressing wheels 82.

Since the pressing wheels 82 are supported on inclined hub tubes 88 and rotate about their axes extending inwardly rearward with respect to the direction of advance of the mulcher and also inclined inwardly downward, the wheels 82 hold the strip 43A slightly tensioned outward transversely of the ridge, with the result that the strip 43A can be laid down over the ridge longitudinally thereof under uniform tension.

The distance of travel of the strip from the roll supporting means 42 to the pressing means 59 is so determined that the strip can be maintained under the proper tension in accordance with the shape of the ridge and the nature of the crop contemplated. With the paying off of the strip 43A by the pressing wheels 82, the diameter of the roll 43 progressively decreases in proportion thereto, consequently altering the peripheral speed of the roll 43 and the position where the strip is paid off or withdrawn.

However, the paying-off position remains definite despite the inevitable decrease of the diameter of the roll 43 since the roll 43 is supported by the frame, in bearing contact with the support rolls 44 with use of support members 44, etc. Moreover, with the roll 43 restrained from forward or backward movement as by the walls defining the vertical grooves 44B, the strip can be pulled out or paid off along a path of specified length and continuously laid down on the ridge A longitudinally thereof free of damage or break. The pressing wheels 82 which are held in pressing contact with the strip 43A without rising act to force the strip into the ground.

The soil applicators 73 of the applying means 60 are positioned to the rear of the pressing means 59 outwardly thereof and also to the rear of the soil cutting members 22 slightly outside thereof. The cut portion and/or escaping portions of soil are gradually guided inward by the soil dividing portions 73B of the applicators 73 and cover the laid-down strip substantially to the shoulders of the ridge as shown in FIG. 15, while upstanding pressing portions 73C act to compact the covering. Since the soil dividing portions 73B extend inwardly rearward with respect to the direction of advance of the mulcher, the pressing portions press the ridge with gradually increasing pressure. Eventually even the top portion of the ridge can be pressed on to prevent separation of the strip 43A.

The contemplated objects of the invention can thus be accomplished by the embodiments described above. The invention is not limited to the structures described but can be altered or modified suitably without departing from the scope of the invention defined in the appended claims. For example, a plurality of mulching units may be provided, with the frame adapted to support a plurality of strip roll cores. The mulcher can be of the self-propelling type to be operated by a driver. The tiller unit and the ridge shaping assembly may be eliminated from the mulcher, which will then be used for mulching ridges formed separately in advance.

What is claimed is:

1. A mulcher for laying down a strip of film over a ridge longitudinally thereof and covering the laid-down strip with soil comprising:
   means for rollably horizontally supporting a roll of the strip transversely of the direction of advance of the mulcher,
   at least one pair of strip pressing means for pressing the strip longitudinally thereof on its opposite side portions, pulling out the strip from the roll and laying down the strip over the ridge, and
   at least one pair of soil applying means for covering the laid-down strip with soil on its opposite sides longitudinally thereof,
   the strip roll supporting means comprising a support portion for rollably supporting the strip roll and restraining portions for restraining the strip roll from moving forward or backward while the strip roll is rolling to permit the strip to be pulled out from a definite position.

2. A mulcher as defined in claim 1 wherein the strip roll support portion comprises rolls, and each of the restraining portions is in the form of a vertical groove for receiving the core of the strip roll therein, a bearing portion being provided at a lower part of the groove for supporting the rolls horizontally, a support member having the groove and the bearing portion and being attached to the frame of the mulcher.

3. A mulcher as defined in claim 1 wherein the strip roll support portion comprises rolls, and support members provided with bearing portions for horizontally and rotatably supporting the rolls are attached to the frame of the mulcher, the rolls for supporting the strip roll serving as the restraining portions.

4. A mulcher as defined in claim 1 wherein the strip roll support portion is a platelike support member having an arcuate surface in conformity with the outer periphery of the strip roll, the platelike support member being attached to the frame to enable arcuate front and rear walls of the support member to serve as the restraining portions.

5. A mulcher as defined in claim 2 or 3 wherein the bearing portion on the support member is in the form of a pair of front and rear upwardly open hooks, and the rolls for supporting the outer periphery of the strip roll thereon have their ends detachably horizontally supported by the hook-shaped bearing portion at each side of the mulcher.

6. A mulcher as defined in claim 2 or 3 wherein the bearing portion on the support member comprises horizontal lateral tubes, and the rolls for supporting the outer periphery of the strip roll thereon have their ends detachably horizontally supported by the bearing tubes.

7. A mulcher for laying down a strip of film over a ridge longitudinally thereof and covering the laid-down strip with soil comprising:
   means for rollably horizontally supporting a roll of the strip transversely of the direction of advance of the mulcher,
   at least one pair of strip pressing means for pressing the strip longitudinally thereof on its opposite side portions, pulling out the strip from the roll and laying down the strip over the ridge,
   at least one pair of soil applying means for covering the laid-down strip with soil on its opposite sides longitudinally thereof, the strip roll supporting means comprising a support portion for rollably supporting the strip roll and restraining portions for restraining the strip roll from moving forward or backward while the strip roll is rolling, and ridge shaping means disposed in a front portion of the mulcher and comprising a pair of opposed side shaping plates provided in front thereof with soil guides for guiding cultivated soil inward toward each other and a top shaping plate extending between the side shaping plates over the space therebetween, each of the side shaping plates being provided with an elongated compacting shaping portion to the rear thereof, whereby the strip is pulled out from a definite position and laid down over the ridge formed by the ridge shaping means.

8. A mulcher as defined in claim 7 wherein the side shaping plates and the top shaping plate provide a ridge shaping portion progressively constricted from front to rear, backward with respect to the direction of advance of the mulcher.

9. A mulcher as defined in claim 7 wherein the compacting shaping portion has a soil cutting member, the soil cutting member having a soil dividing portion inclined outwardly rearward.

10. A mulcher as defined in claim 9 wherein the side shaping plate is provided with an opening at a position in front of the soil cutting member and opposed to the shoulder of the ridge, and an excess of soil escaping from the opening is guided by the soil dividing portion of the soil cutting member.

11. A mulcher for laying down a strip of film over a ridge longitudinally thereof and covering the laid-down strip with soil comprising:

means for rollably horizontally supporting a roll of the strip transversely of the direction of advance of the mulcher, at least one pair of strip pressing means for pressing the strip longitudinally thereof on its opposite side portions, pulling out the strip from the roll and laying down the strip over the ridge, and at least one pair of soil applying means for covering the laid-down strip with soil on its opposite sides longitudinally thereof, the strip roll supporting means comprising a support portion for rollably supporting the strip roll and restraining portions for restraining the strip roll from moving forward or backward while the strip roll is rolling, each of the strip pressing means comprising a pressing wheel rotatably mounted on a hub shaft extending inwardly rearward with respect to the direction of advance of the mulcher and inclined inwardly downward, the pair of pressing wheels being arranged rearwardly outward away from each other, whereby the strip is pulled out from a devinite position and laid down on the ridge while being tensioned outward widthwise thereof and also rearward.

12. A mulcher as defined in claim 11 wherein the pressing wheel is supported by a post upwardly or downwardly movable relative to the frame of the mulcher and provided with means for biasing the wheel into contact with the ground.

13. A mulcher as defined in claim 11 or 12 wherein the pressing wheel comprises a wheel frame and a tread made of hard elastic material and fitting around the wheel frame.

14. A mulcher for laying down a strip of film over a ridge longitudinally thereof and covering the laid-down strip with soil comprising:

means for rollably horizontally supporting a roll of the strip transversely of the direction of advance of the mulcher, at least one pair of strip pressing means for pressing the strip longitudinally thereof on its opposite side portions, pulling out the strip from the roll and laying down the strip over the ridge, and at least one pair of soil applying means for covering the laid-down strip with soil on its opposite sides longitudinally thereof, the strip roll supporting means comprising a support portion for rollably supporting the strip roll and restraining portions for restraining the strip roll from moving forward or backward while the strip is rolling, the pair of soil applying means being provided with soil dividing upstanding portions extending inwardly rearward with respect to the direction of advance of the mulcher for dividing soil inward toward each other, the soil applying means having pressing upstanding portions each extending rearward from the soil dividing upstanding portion and opposed to the shoulder of the ridge.

15. A mulcher as defined in claim 14 wherein each of the soil applying means is a shoe-type soil applicator having the soil dividing upstanding portion and the pressing upstanding portion, and the applicator is supported by a support upwardly or downwardly movable relative to the frame of the mulcher and having means for biasing the applicator into contact with the ground.

16. A mulcher as defined in claim 15 wherein the pressing upstanding portion of the shoe-type applicator is provided with an elastic flexible member.

* * * * *